C. H. NORDELL.
WATER SOFTENER.
APPLICATION FILED JUNE 5, 1920.
1,410,712.
Patented Mar. 28, 1922.
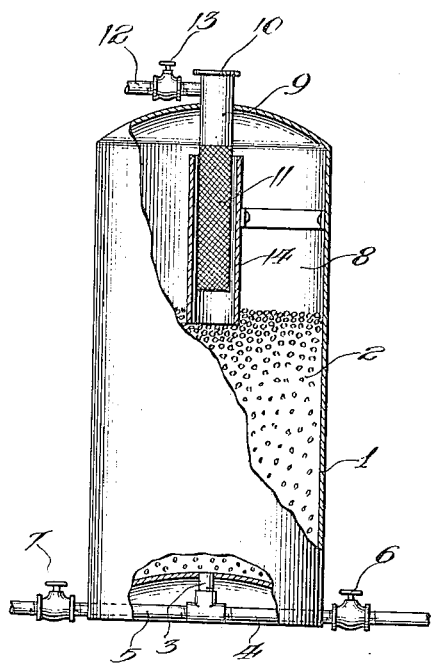
Witness:
Stephen J. Kelna
Inventor:
Carl H. Nordell
By Chamberlin Brendenreid
Attys.

UNITED STATES PATENT OFFICE.

CARL H. NORDELL, OF CHICAGO, ILLINOIS, ASSIGNOR TO WILLIAM J. KENNEY, OF CHICAGO, ILLINOIS.

WATER SOFTENER.

1,410,712.  Specification of Letters Patent.  Patented Mar. 28, 1922.

Application filed June 5, 1920. Serial No. 386,890.

*To all whom it may concern:*

Be it known that I, CARL H. NORDELL, a citizen of the United States, residing at Chicago, county of Cook, State of Illinois, have invented a certain new and useful Improvement in Water Softeners, and declare the following to be a full, clear, and exact description of the same, such as will enable others skilled in the art to which it pertains to make and use the same, reference being had to the accompanying drawings, which form a part of this specification.

A type of water softening apparatus that has come largely into use is one in which the water is filtered through a bed of material of a zeolitic nature. The rate at which such a softener will treat water is limited and seldom rapid enough to take care of the peak loads imposed upon it. The practice is therefore to store softened water in a separate tank either placed high enough to give the desired head, or else placed low and formed with an air pocket containing air under pressure which will cause the water, as required, to be expelled at the proper pressure. Furthermore, after an apparatus of this kind has been used for some time, the filtering bed must be regenerated, this being at present accomplished by preparing a brine solution in a separate tank and passing such solution through the zeolitic material while the supply of water to be softened and the outlet for softened water are shut off. The old method of operating these softeners results in a compacting of the mass of zeolitic material which is orignally introduced in a loose state, the compacting resulting not only from the weight of the material itself, but from the downward flow of the water through the same, the water being introduced at the top and withdrawn at the bottom. By reason of the fact that the water flows downwardly through the bed, any sediment that is carried in suspension in the raw water will collect at the top of the bed and must be flushed out by means of an upflowing current of water.

The object of the present invention is to produce a simple and novel water softener of the above type which will require only a single tank, in which the bed of zeolitic material will remain loose while in use, in which regeneration may be quickly and conveniently effected with a minimum expenditure of salt and water, and from which the sediment may be removed by a simple draining operation.

The various features of novelty whereby my invention is characterized will hereinafter be pointed out with particularity in the claims; but, for a full understanding of my invention and of its objects and advantages, reference may be had to the accompanying drawing which is a view partly in side elevation and partly in section, illustrating a preferred embodiment of my invention.

Referring to the drawing, 1 represents a closed tank of any usual or suitable construction. This tank is partially filled with a loose mass of material, 2, of zeolitic nature. Connected to the bottom of the tank is an inlet pipe, 3, which is joined to a supply pipe, 4, and also to a drain pipe, 5. The supply pipe has a valve, 6, and the drain pipe a valve, 7. The space, 8, in the tank above the bed of zeolitic material is a storage space for softened water. In this space lies a receptacle or container into which salt may be placed for regenerative purposes, this receptacle or container being permeable to water so that it may at other times serve as the discharge outlet from the storage chamber. The receptacle or container may conveniently be in the form of a tube, 9, of considerable diameter projecting through the top wall of the tank, the tube being permanently closed at the bottom and having an open top normally closed by a suitable detachable cap, 10. At least a part of the tube is made permeable to water. This may conveniently be accomplished by making that part, as indicated at 11, out of open mesh, such as brass wire cloth. The wall of the tube is preferably made imperforate for a considerable distance below the top of the tank; thus permitting air to be pocketed in the top of the storage space or chamber and thus form an elastic cushion which may be placed under pressure. The outlet for the softened water may conveniently be a pipe, 12, connected to the member 9 at a point above the tank and provided with a suitable shut-off valve, 13.

In using the apparatus the valve 6 is opened and the valve 7 is closed. The valve 13 may also be left closed. Water is thus caused to flow upwardly through the bed of zeolitic material, the same finally rising into the storage space or chamber until it rises above the top of the perforated part, 11, of the member 9. As the water rises in the tank, the air is compressed above the same until, when the water reaches the top of the perforated portion of the member 9, there lies above it in the tank a pocket of air compressed to a considerable degree. Then, when the valve 13 is opened, this air serves to discharge the softened water under pressure regardless of the pressure of the delivery pipe. Any sediment held in suspension in the raw water will collect on the bottom of the tank and may readily be removed by draining it out through the drain pipe, 5. Since the course of the water during normal operation is always in the upward direction through the bed of zeolitic material, there is a constant tendency to raise the individual pieces composing this bed, thus keeping the bed loose and maintaining the interstices therein sufficiently open to permit a free flow of water without the need of additional agitation.

When it is desired to regenerate the zeolitic material, all of the valves are closed, and a charge of salt is deposited in the salt container, 9. As the softened water comes in contact with the salt, the brine is formed which, by reason of its greater specific gravity than that of the softened water, descends into the bed of zeolitic material where it displaces other water which rises to the top; so that finally all of the liquid in the lower part of the tank will be a brine solution. The quantity of salt used for this purpose may be calculated to be of the desired brine strength for only approximately such quantity of liquid as will fill the lower part of the tank since the softened water in the storage chamber may remain in its normal condition.

In order to guard against wasting salt by diffusion of the brine laterally through the storage chamber, the perforated portion of the container, 9, may be surrounded by a shell, 14, spaced apart therefrom and so proportioned that liquid enclosed within the same must either flow out of the top or out of the bottom in order to get out into the tank, and cannot flow laterally. Therefore the brine which exudes from the perforated lower portion of the salt container will be positively guided downwardly into the bed of zeolitic material and has no opportunity to flow laterally into the main body of softened water.

While I have illustrated and described with particularity only a single preferred form of my invention, I do not desire to be limited to the exact structural details thus illustrated and described; but intend to cover all forms and arrangements which come within the terms employed in the definitions of my invention constituting the appended claims.

I claim:

1. A closed tank sealed at the top partially filled with material of a zeolitic nature so as to leave a storage space for softened water in the upper portion, and an outlet from said storage space located below the top thereof so as to permit air to be pocketed in said space above said outlet.

2. A closed tank sealed at the top partially filled with material of a zeolitic nature so as to leave a storage space for softened water in the upper portion, a water inlet in the bottom of said tank, and an outlet for softened water leading from the aforesaid storage space.

3. A closed tank partially filled with material of a zeolitic nature so as to leave a storage space for softened water in the upper portion, and a salt container arranged in said space, said container being permeable to water so as to permit the preparation of a brine solution for regeneration of the zeolitic material.

4. A closed tank partially filled with material of a zeolitic nature so as to leave a storage space for softened water in the upper portion, a salt container arranged in said space, said container being permeable to water so as to permit the preparation of a brine solution for regeneration of the zeolitic material, said container opening out through the top of the tank, and a detachable cover for said container.

5. A closed tank partially filled with material of a zeolitic nature so as to leave a storage space for softened water in the upper portion, a salt container arranged in said space, said container being permeable to water so as to permit the preparation of a brine solution for regeneration of the zeolitic material, said container opening out through the top of the tank, a detachable cover for the outer end of said container, a conduit for discharging softened water connected to said container, and a pipe connected to the bottom of the tank to supply water to be softened.

6. A closed tank partially filled with material of a zeolitic nature so as to leave a storage space for softened water in the upper portion, a salt container arranged in said space, a portion of the container below the top of said tank being permeable to water so as to permit air to be pocketed in the extreme upper portion of said space and permit the preparation of a brine solution below the air pocket for the regeneration of the zeolitic material, said container opening out through the top of the tank, a detachable cover for the outer end of said container, a conduit for discharging softened water connected to said container, and a pipe connected to the bottom of the tank to supply water to be softened.

7. The method of operating a water softening apparatus comprising a closed storage tank partly filled with material of a zeolitic nature so as to leave a storage space for softened water in the upper portion, which consists in introducing the raw water into the bottom of said tank and withdrawing water from the lower portion of said storage space.

8. A closed tank partially filled with material of a zeolitic nature so as to leave a storage space of softened water in the upper portion, a salt container arranged in said space and permeable to water so as to permit the preparation of a brine solution for the regeneration of the zeolitic material, and a baffle plate surrounding said container and extending downwardly therefrom for the purpose of causing the brine flowing out of the container to be guided in the downward direction toward the bed of zeolitic material instead of being diffused laterally.

In testimony whereof, I sign this specification.

CARL H. NORDELL.